April 15, 1930. S. C. STEWART 1,754,490
SPRAYING MACHINE
Filed Feb. 17, 1928 2 Sheets-Sheet 2
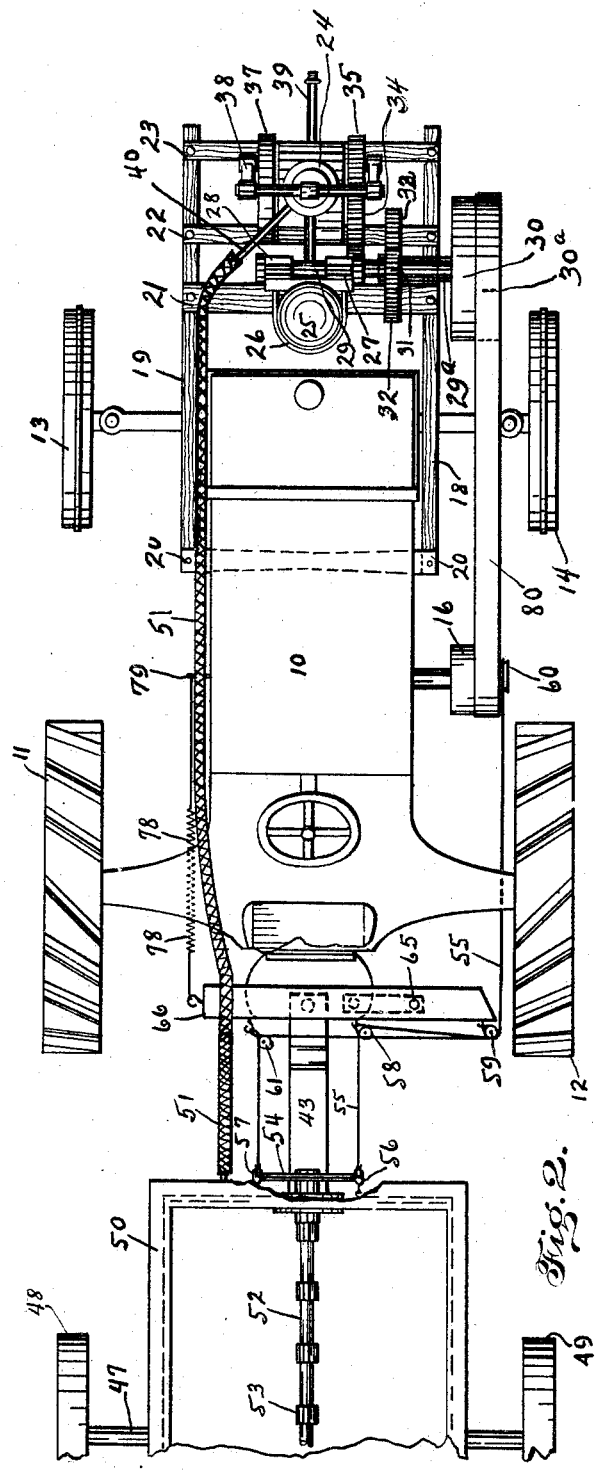
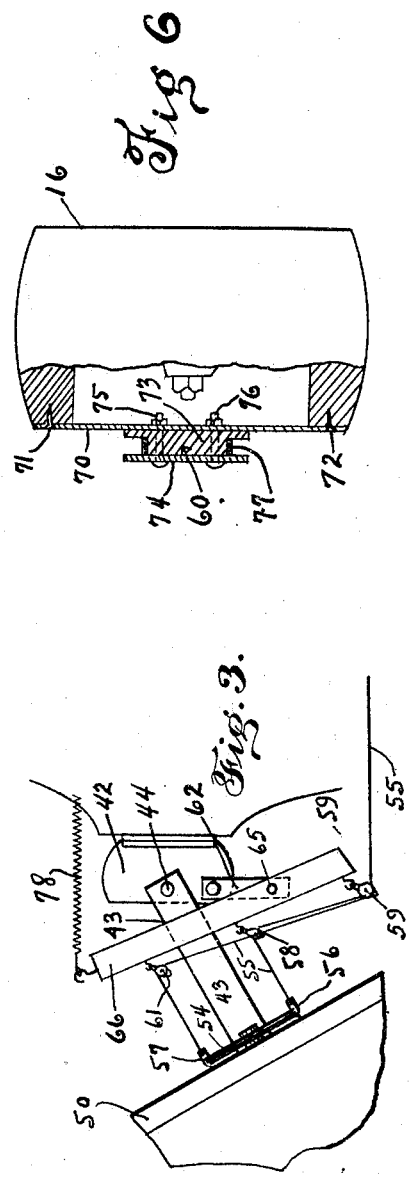
INVENTOR.
S. C. Stewart
BY
ATTORNEY Patented Apr. 15, 1930

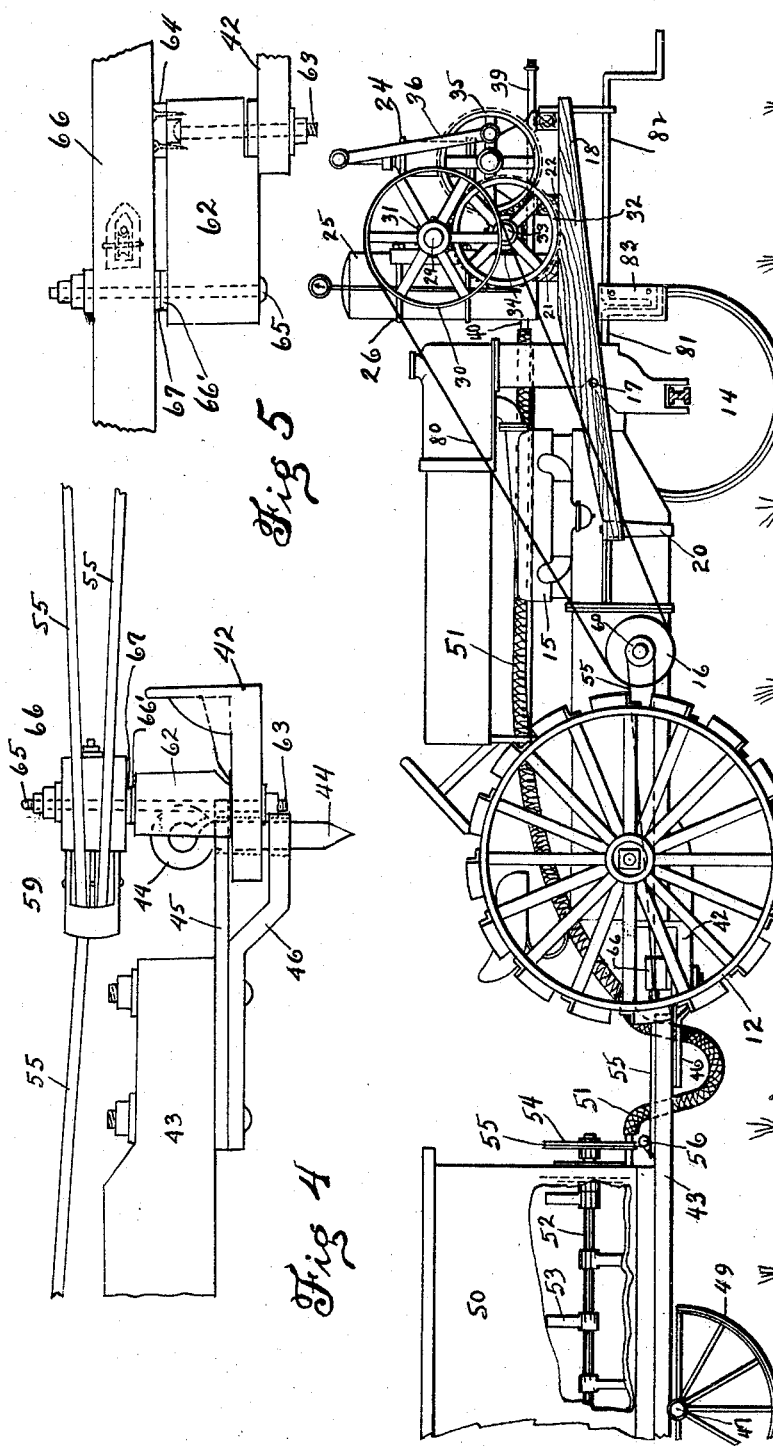

1,754,490

UNITED STATES PATENT OFFICE

SAMUEL C. STEWART, OF HUNTING CREEK, NORTH CAROLINA

SPRAYING MACHINE

Application filed February 17, 1928. Serial No. 255,020.

My invention relates to spraying apparatus and more especially to the combination of a tractor equipped with a pump and with a tank for holding the spraying solution hooked on to the rear of the tractor in a pivotal manner and having means whereby the spraying solution may be agitated at all times when the pump is running regardless of the angle between the tractor and the solution tank.

I am aware that heretofore tractors have been equipped with pumps for spraying, with a tank for the spraying solution hooked to the rear thereof, but in such cases there have been no provisions for copensating for the various angles assumed between the tractor and the trailer with the result that the agitator in the solution tank could be operated only when the trailer and tractor were in perfect alinement.

It is an object of my invention to equip a tractor with a spraying pump adapted to be driven by the power take off of the tractor and also to equip the tractor with a solution tank pivotally connected to the rear end thereof with means for driving the agitator of the solution tank from the power take off of the tractor, and means for permitting the agitator to be driven at all times regardless of the angular relation betwen the tractor and the solution tank.

Another object of my invention is to provide a spraying outfit comprising a combination of a tractor, a spray pump driven by the power take off of the tractor, a spray solution tank pivotally connected to the rear end of the tractor, an agitator in the tank, and means pivotally mounted on the rear end of the tractor at one side of a median line therethrough for holding in suitable pulleys a belt running from the power take off of the tractor to the agitator to cause the belt to remain taut at all times, even while the tractor is disposed at an angle to the solution tank.

Some of the objects of my invention having been stated, other objects will appear as the description proceeds, when taken in connection with the accompanying drawings, in which:

Figure 1 is a side elevation of my complete combination with portions thereof broken away for better illustrations;

Figure 2 is a plan view of Figure 1;

Figure 3 is an enlarged detail plan view of the compensating means for the agitator belt;

Figure 4 is an enlarged detail view showing side elevation of the structure in Figure 3;

Figure 5 is a front elevation of a portion of the structure in Figure 4;

Figure 6 is an enlarged view, partly in cross section of the power take off pulley of the tractor.

Referring more particularly to the drawings, the numeral 10 indicates a tractor having the wheels 11, 12, 13, and 14. Conventional motor 15 with the power take off pulley 16, and secured to a suitable bolt 17 on opposite sides of the radiator of the tractor are the forwardly projecting members 18 and 19, the rear ends of these members being secured to the flattened U-shaped member 20 which curves underneath the engine. On the forward portion of the members 18 and 19 the cross pieces 21, 22, and 23 are secured and on these cross members the conventional spraying pump 24 is mounted, this pump having the conventional compression tank 25 and secured around this compression tank by means of the U-shaped bolts 26 are the bearing members 27 and 28 for fixedly securing the shaft 29 to the compression tank 25, said shaft 29 having the belt pulley 30 and the idler pulley 30ª loosely mounted thereon on its outer end, and the belt pulley 30 has the extension 29ª on which the gear wheel 31 is fixedly mounted, said gear wheel meshing with the gear wheel 32 which is mounted on the shaft 33, and on this shaft 33 is fixedly mounted the gear wheel 34 which meshes with the gear wheel 35 mounted on the main shaft of the pump, and secured to this gear wheel 35 is the connecting rod 36 for driving the pump. The wheel 37 has a similar connecting rod 38 on the other side of the pump. A crank may be used instead of the wheel 137 if desired. This pump has the nozzle 39 to which the spraying hose is adapted to be connected, and running rearwardly from the pump is the pipe 40 which is connected to the hose 51 which serve as the intake for leading the spraying solution from the tank to the pump.

The rear axle housing 41 has the drawbar 42 secured to the rear thereof. This drawbar is adapted to have connected thereto the tongue 43 by means of the pin 44 piercing the members 45 and 46, secured to the lower face of the tongue. This tongue 43 projects rearwardly and is connected to the axle 47 on which the wheels 48 and 48 are mounted, and these parts support the tank 50, which is adapted to hold the spraying solution. This tank 50 is connected to the pipe 40 by means of the flexible hose 51. A suitable agitator shaft 52 is secured lengthwise of the tank 50 and has the blades 53 secured thereon for stirring the spraying solution. On the forward end of this shaft 52 the grooved pulley is secured, and around this pulley the round belt 55 is adapted to be placed for driving the agitator. This belt is secured in pulleys 56 and 57 and is thence led thru the pulley 58, then thru the double pulley 59 and then around the pulley 60 mounted on the main pulley 16 and back thru the double pulley 59 and then thru the pulley 61, thus forming a complete belt. In order to provide for keeping the belt taut at all times, I have secured to the drawbar 42 the laterally projecting member 62, this member 62 being secured to the drawbar by means of the bolt 63, which bolt has its head portion countersunk in the member 62, and above the head of the bolt 63 is mounted the rubber washer 64. The other end of the member 62 has the bolt 65 projecting upwardly therethrough with the washers 66' and 67 thereon, and pivotally mounted on this bolt is the member 66, which member carries the pulleys 58, 59 and 61.

In Figure 3, I have shown how the compensating device works when the tractor is being steered not in a straight line. By the arrangement provided the tractor can be turned as if there were no tank or trailer attached thereto, as the compensating means allows the tractor to be turned as desired and the trailer will follow and the agitator will be in operation at all times due to the compensating means to keep the belt 55 taut at all times, even while the tractor is being turned.

In Figure 6 I have shown the manner of attaching the pulley 60 to the main pulley 16. I secure the sheet metal member 70 to the pulley 16 by means of the screws 71 and 72, and to the outer surface of the member 70 I secure the members 73 and 74 by means of the bolts 75 and 76 and provide the friction lining 77, thus forming a compact and durable pulley.

To the outer end of the member 66 I secure the tension spring 78, the other end of the spring being secured to a portion of the tractor as at 79, this spring tending at all times to pull the member 66 and associated parts back to normal position when the tractor and solution tank assume a position of alinement.

I provide the belt 80 which serves for driving the pump by being passed around the pulleys 16 and 30. In the position shown in Figure 2 the belt is in inoperative position as it is on the idler pulley 30ª, but when placed on the pulley 30 will serve to drive the pump.

In order to provide means for cranking the motor with my device installed on a tractor, I have provided a clamping member 82 to secure the crank 81 to the crank 82.

By mounting the pump on the front end of the tractor, this has a tendency and does hold the front portion of the tractor to the ground, and also removes this much weight and space from the trailer and permits a greater amount of spraying solution to be carried.

In the drawings and specification I have set forth a preferred embodiment of my invention, and although specific terms are employed they are used in a generic and descriptive sense only and not for purposes of limitation, the scope of my invention being set forth in the appended claims.

I claim—

1. In a spraying apparatus, a motor propelled frame, a pump on the front end of the frame gear and belt connection between the pump and the motor for driving the pump, a wheeled frame pivotally secured to the rear end of the tractor for lateral movement, a tank mounted on the pivoted frame, a longitudinally disposed shaft mounted in the tank, agitating devices mounted on the shaft, a pulley mounted on the front end of the shaft, a belt mounted on the pulley and running through other pulleys to the said motor, pivoted means holding a portion of the pulleys to preserve a uniformity of tautness in the belt while the tractor is being turned at an angle to the pivoted wheeled frame secured to the rear end thereof, and a hoseline leading from the tank to the pump.

2. In a power propelled spraying outfit the combination of a spraying pump mounted on a traction engine and adapted to be driven from the power take-off of the said engine, a wheeled frame pivotally connected to the rear end of the traction engine for lateral movement with respect to the traction engine, a tank for holding the spraying solution mounted on the wheeled frame, a shaft mounted in the tank and having agitating means secured thereon, a grooved pulley on the front end of the agitating shaft, a belt secured around the said grooved pulley and running to the power take-off of the traction engine, a series of pulleys for supporting the belt, said pulleys being mounted on means pivoted to the traction engine at one side thereof to preserve a uniform tautness of the belt regardless of the position of the wheeled tank frame with relation to the traction engine.

3. In a spraying device, a traction engine a power take off on said traction engine, a frame work having traction wheels thereon, and being pivotally connected to the rear end of the tractor, a tank on said frame work, an agitator in said tank, a pulley wheel on the front of said agitator, a belt connected to the power take off on the traction engine and also to said pulley, and being adapted to drive the pulley on said agitator at all times regardless of the angularity of the said tank to the said traction engine, and means associated with said belt for preserving a uniform tension in the belt regardless of the angularity between the said tractor and the said agitator.

4. In a spraying outfit, a traction engine, a wheeled frame work pivotally secured to the rear end of the traction engine, a tank on said frame work, an agitator in said tank, a power take off on said traction engine, a belt mounted on said power take off and also on the said agitator in said tank, a pivoted member mounted on the rear end of the tractor and having a plurality of pulleys thereon in which said belt is adapted to operate, said pivoted member and said pulleys being adapted to preserve a uniform tension in the belt regardless of the angle at which the tractor is disposed with relation to the tank.

5. In a combined tractor and spraying tank, an agitator in said spraying tank, a power take off on said tractor, a belt mounted on said power take off and also being mounted on the agitator, a member pivoted on the rear end of the tractor, a plurality of pulleys on said member, said pulleys being adapted to support said belt, said pivoted member and said pulleys being adapted to preserve a uniform tension in the belt regardless of the angularity of said tractor with relation to said tank.

6. In a spraying outfit, a traction engine, a tank mounted on a wheeled frame work and being pivotally connected to the rear end of the tractor, a longitudinally disposed agitator in said tank, a pulley mounted on a power take off on said tractor, a pulley mounted on the forward end of the agitator, a belt mounted on said pulleys, a member pivoted transversely of the tractor to the rear end thereof, and being pivoted on one side of said tractor, a plurality of pulleys on said transversely disposed member through which the belt is adapted to be passed, said pulleys and said transversely disposed member being adapted to preserve a uniform tension in said belt at all times regardless of the angularity between said agitator and the said tractor.

7. In a combined spraying outfit, a traction engine, a power take off on said traction engine, a wheeled tank adapted to be pivotally connected to the rear end of said traction engine, a longitudinally dispose agitator mounted in the said tank, a pulley on the forward end of said tank, a belt running over said pulley, and being connected to the power take off on said engine, a transversely disposed member pivotally connected to the rear end of the tractor at one side thereof, a plurality of pulleys mounted on said transversely disposed member through which said belt is adapted to pass on its travel between the pulley on the agitator and power take-off on the traction engine, said pulleys and transversely disposed member being adapted to preserve a uniform tension in the belt regardless of the angle at which the tractor is disposed with relation to the tank.

8. In a spraying outfit, a traction engine, a wheeled tank pivotally connected to the rear end of the traction engine, an agitator mounted in said tank, a power take off on said engine, a belt adapted to be passed from said power take off to said agitator, means for preserving a uniform tension in said belt regardless of the angularity between the said tank and the said tractor, said means comprising a transversely disposed member pivotally mounted at one side of the rear portion of the tractor, a pulley mounted on one end of said transversely disposed member, a pulley mounted on the other end of the said transversely disposed member, a pulley mounted near the central portion of said transversely disposed member, a pulley mounted on each side of the tank near the lower portion thereof, said belt being adapted to pass through the said pulleys, over the pulley on the agitator, and over the pulley on the power take off, said arrangement being adapted to preserve a uniform tension in the belt regardless of the angularity at which the tank is placed with relation to the tractor.

In testimony whereof I affix my signature.

SAMUEL C. STEWART.